(12) United States Patent
Butterweck et al.

(10) Patent No.: US 11,658,510 B2
(45) Date of Patent: May 23, 2023

(54) PHOTOVOLTAIC ENERGY GENERATING SYSTEM, SUPPLY LINE FOR AN ENERGY GENERATING SYSTEM, MATING PLUG, AND POWER INVERTER

(71) Applicant: SMA Solar Technology AG, Niestetal (DE)

(72) Inventors: Simon Butterweck, Helsa (DE); Oliver Prior, Bad Arolsen (DE)

(73) Assignee: SMA Solar Technology AG, Niestetal (DE)

( * ) Notice: Subject to any disclaimer, the term of this patent is extended or adjusted under 35 U.S.C. 154(b) by 108 days.

(21) Appl. No.: 17/064,841

(22) Filed: Oct. 7, 2020

(65) Prior Publication Data
US 2021/0028744 A1    Jan. 28, 2021

Related U.S. Application Data

(63) Continuation of application No. PCT/EP2019/058745, filed on Apr. 8, 2019.

(30) Foreign Application Priority Data

Apr. 10, 2018  (DE) .................... 10 2018 108 472.2

(51) Int. Cl.
*H02J 11/00*    (2006.01)
*H02S 40/32*    (2014.01)
(Continued)

(52) U.S. Cl.
CPC ............ *H02J 11/00* (2013.01); *H02J 3/381* (2013.01); *H02J 3/388* (2020.01); *H02J 3/46* (2013.01);
(Continued)

(58) Field of Classification Search
CPC ................................ H02S 40/34; H02S 40/32
See application file for complete search history.

(56) References Cited

U.S. PATENT DOCUMENTS

2003/0111103 A1*  6/2003  Bower .................... H02J 3/381
                                                136/244
2010/0320842 A1  12/2010  Beck
(Continued)

FOREIGN PATENT DOCUMENTS

DE    102008032317 A1    12/2009
DE    102012217884 A1    2/2014

OTHER PUBLICATIONS

International Search Report dated Jul. 12, 2019 in connection with PCT/EP2019/058745.

*Primary Examiner* — Sadie White
(74) *Attorney, Agent, or Firm* — Eschweiler & Potashnik, LLC

(57) ABSTRACT

A photovoltaic energy generation system with a string including a series connection of solar modules, which string is electrically connected to an inverter via power lines for converting and feeding electrical power from the string into a network. The inverter is configured to obtain an alternative operating power from only one of the solar modules in the event that normal operating power can be obtained neither from the network nor from the entire string. A supply line can supply the alternative operating power to the inverter. Furthermore, the connectors and mating connectors of such a supply line are described, which can also be installed with an inverter.

13 Claims, 6 Drawing Sheets

(51) Int. Cl.
    *H02S 40/34*     (2014.01)
    *H02J 3/38*     (2006.01)
    *H02J 3/46*     (2006.01)

(52) U.S. Cl.
    CPC .............. *H02S 40/32* (2014.12); *H02S 40/34* (2014.12); *H02J 2300/24* (2020.01)

(56) References Cited

U.S. PATENT DOCUMENTS

| | | | |
|---|---|---|---|
| 2011/0273130 A1* | 11/2011 | Lee | H02J 3/381 320/101 |
| 2013/0057989 A1* | 3/2013 | Victor | H02J 3/46 361/62 |
| 2013/0320771 A1* | 12/2013 | Adest | H01L 31/04 363/16 |
| 2015/0146463 A1 | 5/2015 | Danmayr | |
| 2015/0236182 A1* | 8/2015 | Moslehi | H01L 31/02245 136/249 |
| 2015/0381108 A1* | 12/2015 | Höft | H02S 50/00 361/91.1 |
| 2016/0226256 A1* | 8/2016 | Falk | H02J 3/466 |
| 2017/0077343 A1* | 3/2017 | Morad | H01L 31/0747 |
| 2017/0179876 A1* | 6/2017 | Freeman | H02S 50/00 |
| 2017/0324269 A1* | 11/2017 | Lee | H02S 40/34 |
| 2019/0214511 A1 | 7/2019 | Hopf | |

\* cited by examiner

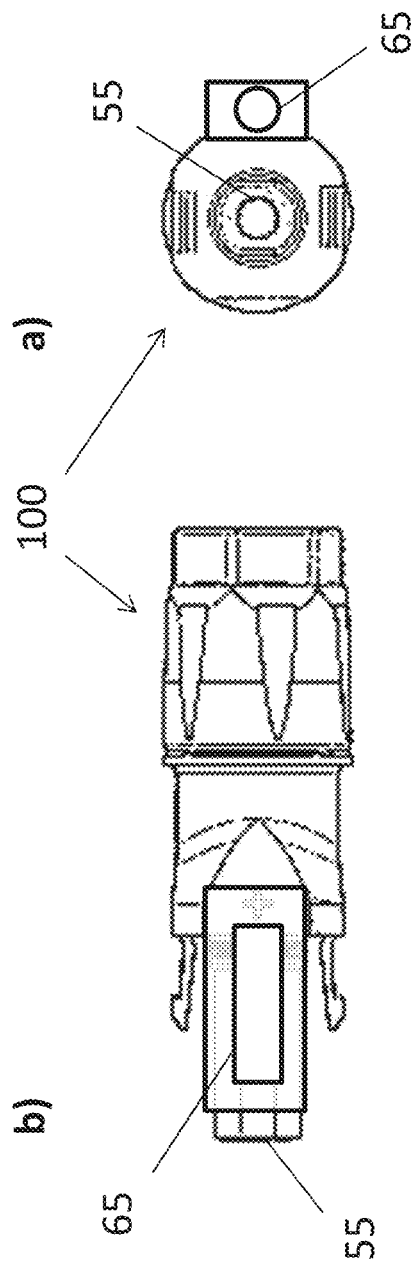

PHOTOVOLTAIC ENERGY GENERATING SYSTEM, SUPPLY LINE FOR AN ENERGY GENERATING SYSTEM, MATING PLUG, AND POWER INVERTER

CROSS REFERENCE TO RELATED APPLICATIONS

This application is a continuation of International Patent Application number PCT/EP2019/058745, filed on Feb. 26, 2019, which claims priority to German Patent Application number 10 2018 108 472.2, filed on Apr. 10, 2018, and is hereby incorporated by reference in its entirety.

FIELD

The disclosure relates to a photovoltaic power generation system. Furthermore, the disclosure relates to a supply line for a photovoltaic power generation system, a mating connector to a connector of the supply line, and an inverter.

BACKGROUND

Photovoltaics is one of the key technologies in the energy turnaround, i.e. the move away from fossil fuels to renewable energy sources. Here, sunlight is converted directly into electrical power in a photovoltaic energy generation system with the help of solar modules of a solar generator in the form of a direct current voltage, which in turn is converted into alternating current by means of an inverter for feeding into an alternating current network. The resulting problem of the electrical supply to the inverter's electronics is typically solved by the inverter preferentially drawing the supply power from the AC grid, or, if the inverter is disconnected from the grid, from the connected solar generator. However, since the voltage of the irradiated solar generator is much higher than the voltage required for the supply, a lossy reduction of the solar generator voltage to the supply voltage must be carried out. In addition, there are requirements for operating states of the power generation system in which, in addition to the grid, the solar generator must also be separated from the inverter or even the individual solar modules of the solar generator must be separated from each other and/or short-circuited so that voltage limits within the power generation system are not exceeded for reasons of personal safety. In this case, the option of supply from the solar generator is not available.

For this reason, EP 2 267 860 A2 proposes the use of an additional energy source to supply an inverter upon disconnection from the grid and the solar generator, which supplies the inverter with power from the grid.

SUMMARY

In the light of the above mentioned state of the art, it is the task of this disclosure to provide a photovoltaic power generation system in which the inverter can be supplied with electrical power even if the inverter is disconnected from the grid and, for example, narrow voltage limits must be maintained by the solar generator due to normative requirements. It is also the task of this disclosure to represent a connecting line or a plug system with which a photovoltaic energy generation system is enabled to supply itself from a voltage-limited solar generator.

A photovoltaic power generation system according to the disclosure is disclosed comprising a string having a series connection of solar modules, which string is electrically connected to an inverter via power lines for converting and feeding electrical power of the string into a grid. The inverter is configured to obtain an alternative operating power from only one of the solar modules in the case that a normal operating power cannot be obtained from the grid or the entire string. The one of the solar modules that generates the alternative operating power is, in one embodiment, placed at one end of the series connection.

In a first embodiment, the alternative operating power is obtained from a voltage applied between solar module connections of one solar module. In this case, all the power generated by the solar module is available as alternative operating power.

In a second embodiment, one of the solar modules has a submodule connection electrically connected to an intermediate point between submodules of the one solar module, wherein the alternative operating power is obtained from a voltage applied between the submodule connection and a solar module connection of the one solar module. As a result of this, only a part of the electrical power which can be generated by the solar module is available as alternative operating power, but due to the lower voltage this power can be used more easily as alternative operating power.

In a further embodiment, which can be combined with the first and second embodiments, a DC/DC converter, in particular an output voltage controlled buck converter, is arranged between one solar module and the inverter to convert the alternative operating power. The DC/DC converter converts the voltage provided by the solar module into a lower voltage value that can be used directly by inverters as alternative operating power. If an operating voltage required by the inverter is higher than the voltage provided by the solar module, a boost converter can also be used. Of course, a buck-boost-converter can also be used, which allows both an increase and a reduction of the solar module voltage.

The DC/DC converter is, in one embodiment, also supplied by the power provided by the solar module and is advantageously operated only when the alternative operating power is required to operate the inverter.

In a particularly simple variant of a power generation system according to the disclosure, the inverter is set up to receive the alternative operating power via the power lines. In this case, a blocking diode is arranged in a connecting line between one of the solar modules and one of the connecting lines. If the string voltage applied between the connecting lines is higher than the voltage of one of the solar modules, the blocking diode blocks and only allows current to flow when the string voltage falls below the voltage of the solar module, for example, when a connection between the solar modules is disconnected.

In one embodiment the DC/DC converter or blocking diode can be placed near the solar modules as independent components of the power generation system or integrated into the inverter.

In one embodiment of the power generation system according to the disclosure, the inverter has a further connection for receiving the alternative operating power together with a string connection, via which one of the power lines is connected to the inverter. The further connection and the string connection of the inverter can be integrated in a common plug connection. If the inverter has this additional connection, a connecting line is, in one embodiment, provided for the transmission of the alternative operating power, which is installed together with the connecting lines connected to the string connection. This connecting line and the power line connected to the string connection form advantageously a common supply line with a common external insulation, which preferably has a plug at each end with separate plug contacts for the connecting line and the power line.

If the photovoltaic power generation system is set up to electrically disconnect all solar modules of the string and/or to short circuit all solar modules of the string (except one solar module providing the alternative operating power) when disconnected from the grid and/or in case of danger, an alternative operating power for supplying the inverter can still be obtained from the one—not short-circuited—solar module. This alternative operating power can then be used, for example, to restart the power generation system after the end of the hazardous event, or to enable data communication with the power generation system at any time.

Another embodiment of the disclosure relates to a supply line for a photovoltaic power generation system with an inverter and a string connected to it from a series connection of solar modules. The supply line comprises a power line for transmitting a string current of the photovoltaic power generation system to an inverter, a connecting line for transmitting an alternative operating power to the inverter, and an external insulation surrounding the power line and the connecting line and having an insulation resistance corresponding to a string voltage of the photovoltaic power generation system. Male or female plugs are arranged at both ends of the supply line, which each have a plug contact for the connecting line and a plug contact for the power line, wherein the connecting line and the power line are, in one embodiment, insulated from one another with an insulation strength which is lower than the insulation strength with respect to the string voltage of the photovoltaic energy generation system, and in particular corresponds to an insulation strength with respect to a solar module voltage, and wherein the plugs at both ends of the supply line are, in one embodiment, plug-compatible with SunClix connections. Such SunClix connections are available e.g. from Phoenix Contact and have established themselves especially within the DC cabling of photovoltaic systems. The plug contact for the connected load corresponds to the plug contact of a conventional connector, while the plug contact for the connecting line is arranged laterally with respect to a plug-in axis of the connector and is electrically connected to a corresponding mating plug contact of a mating connector together with the plug contact of the power line when plugged in. For the purpose of protection against accidental contact, the plug contact and mating contact can each be accommodated in housing attachments made of insulating material. A transfer of the modification described above to other connection systems commonly used in photovoltaics is conceivable and easily implemented.

A mating connector to a connector of such a supply line is also subject of the disclosure, whereby each plug contact of the connector is assigned a mating contact of the mating connector.

Such a mating connector can be used instead of a conventional, plug-compatible mating connector as part of an inverter to establish an electrical connection with a solar module in a photovoltaic power generation system. In particular, the mating connector can be permanently installed in an opening in the inverter housing. In this way, it is possible to supply the inverter with an alternative operating power, although such a supply can also be dispensed with by inserting a conventional plug into the mating connector of the inverter.

BRIEF DESCRIPTION OF THE DRAWINGS

In the following, the disclosure is described in more detail by means of figures, of which FIG. 6 shows a version of a connector designed as a mating connector to the connector of FIG. 5.

DETAILED DESCRIPTION

Figure 1:
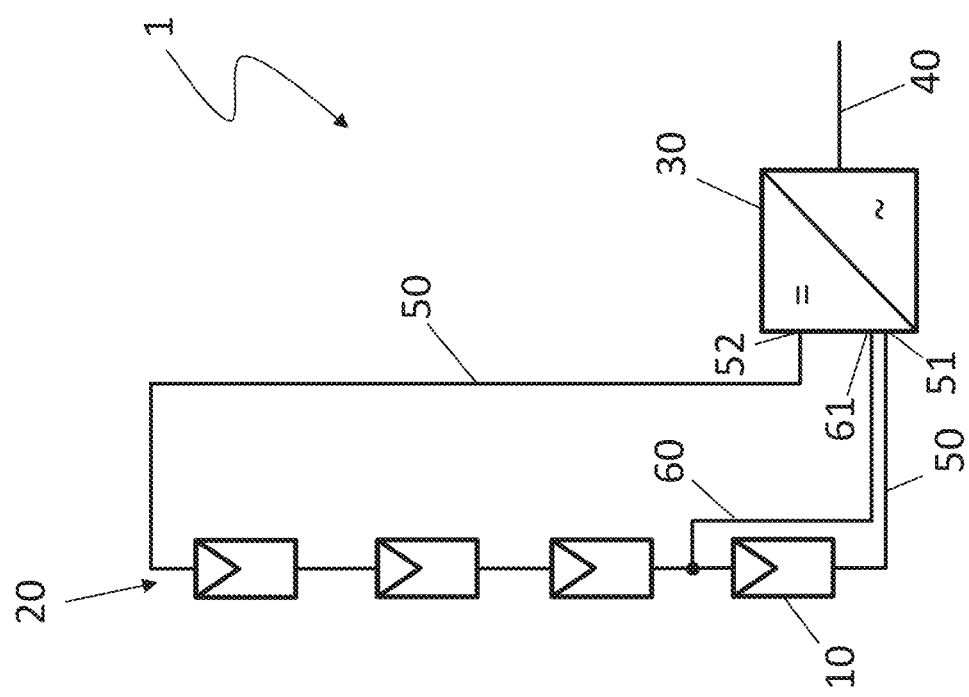
FIG. 1 shows a first version of a power generation plant according to the disclosure.

A power generation system 1 in accordance with the disclosure has an inverter 30, which can be connected to an AC voltage grid via a mains connection 40. On the DC side, the inverter 30 is electrically connected via power lines 50 to a solar generator designed as a string 20. The power lines 50 are connected to string connections 51, 52 of the inverter 30. The string 20 is formed by a series connection of solar modules 10. One of the solar modules 10 is connected to a first solar module connection with one of the power lines 50 and to a second solar module connection with a connecting line 60, as well as to further solar modules. The connecting line 60 is connected to the inverter 30 via a supply connection 61, so that the inverter 30 can optionally receive both an electrical power of the entire string 20 via the string connections 51, 52 and an alternative operating power, which is only generated by one of the solar modules 10, via one of the string connections 51 and the supply connection 61. For the provision of the alternative operating power, it is not decisive here whether one of the solar modules 10 is electrically connected to the other solar modules of the string 20 or whether the other solar modules generate power at all. In one embodiment, the connecting line 60 is installed together with one of the power lines 50 and both together form a supply line with common external insulation. The insulation requirement of the connecting line 60 compared to one of the power lines 50 does not require extensive insulation, as the voltage between the two lines is determined by the voltage of the solar module 10 and is therefore too low to form an arc, for example.

Figure 2:
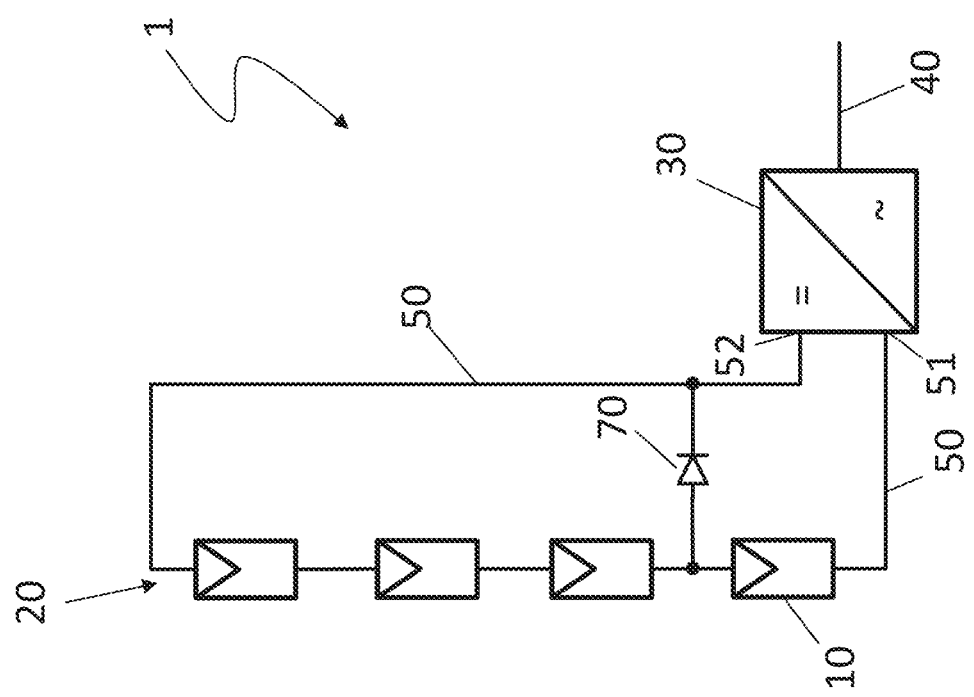
FIG. 2 shows a second version of a power generation plant according to the disclosure.

A further version of a photovoltaic power generation system 1 according to the disclosure is shown in FIG. 2. Here, instead of an additional connecting line, only an additional connection is provided between one of the solar modules 10, which is connected to the inverters 30 on one side with a power line 50, whereby the additional connection is made to the other power line 50 via a diode 70. This ensures that the inverter 30 can receive at least power generated by one of the solar modules 10 of string 20 via its string connections 51, 52, even if the other solar modules cannot provide any power via the supply lines, for example because they are short-circuited or electrically isolated from each other. On the other hand, diode 70 prevents current flow through this connection if the voltage of string 20 applied to power lines 50 exceeds the voltage of one solar module 10.

Figure 3:
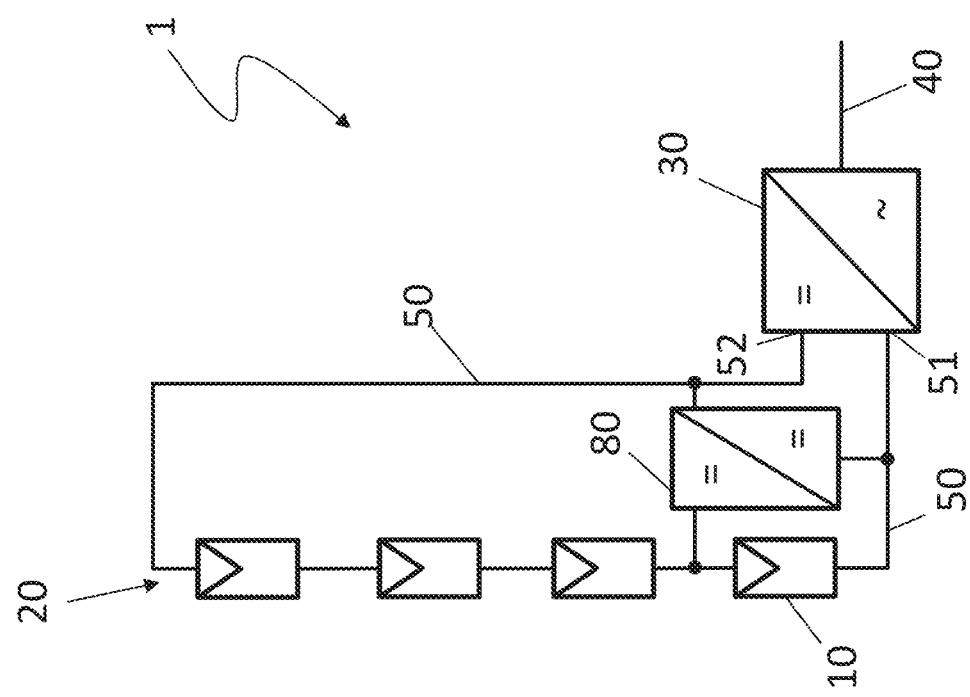
FIG. 3 shows a third version of a power generation plant according to the disclosure.

The further version of FIG. 3 differs from the version of FIG. 2 in that a DC/DC converter 80 is now used instead of a diode 70. This converter can be configured as a boost converter or a buck converter. The DC/DC converter 80 is, in one embodiment, only operated if the string 20 does not provide any power via the power lines 50. In this case, the operation of the DC/DC converter 80 provides the inverter 30 with an alternative operating power via the string connections 51, 52. In an advantageous embodiment, the DC/DC converter is operated as an output voltage-regulated converter. The DC/DC converter 80 is, in one embodiment, a buck converter, that generates and provides the alternative operating power at a specified operating voltage, for example 5 V or 12 V, from the voltage of one solar module 10. The supply power for operating the DC/DC converter 80 is, in one embodiment, also taken from the one solar module 10.

Figure 4:
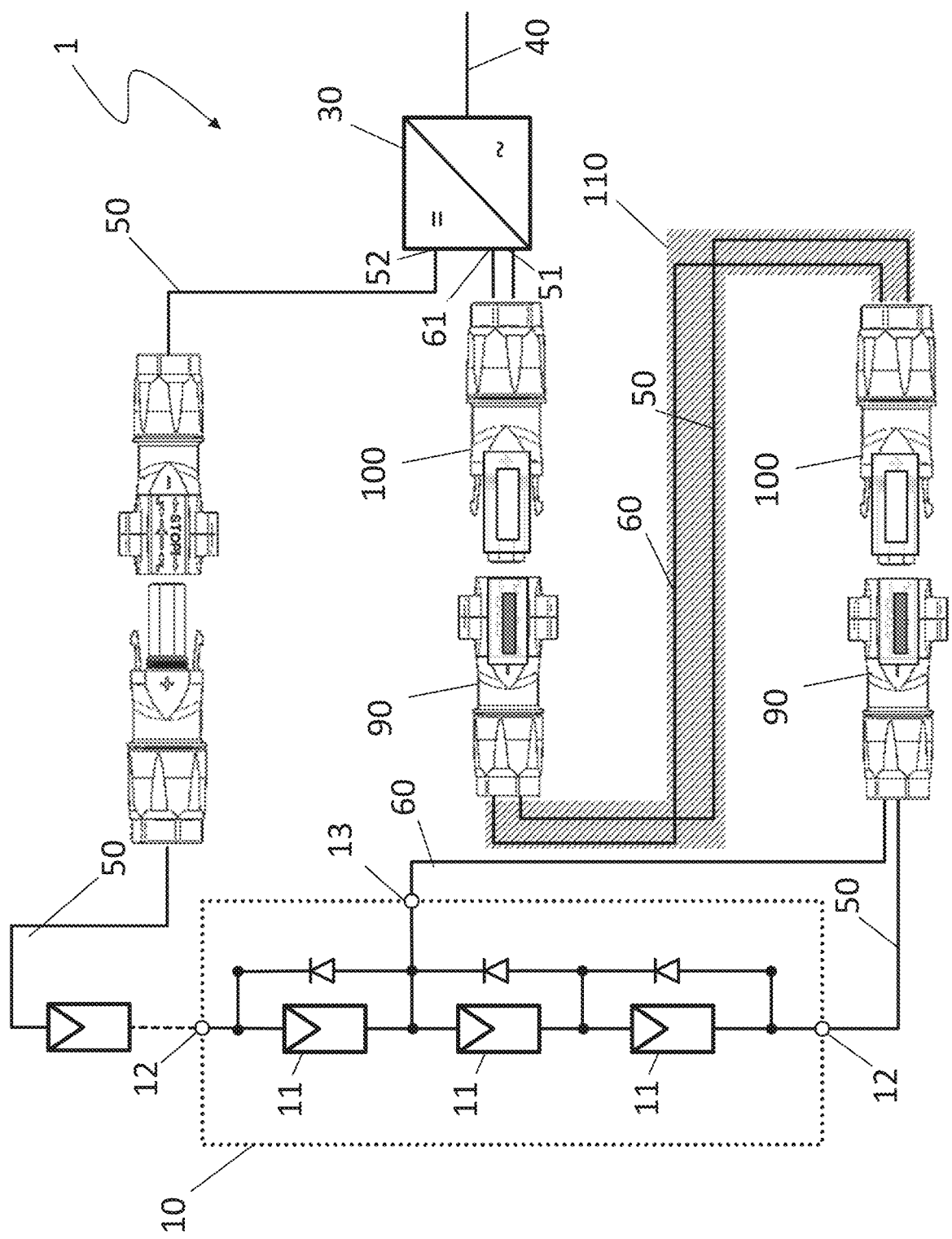
FIG. 4 shows a layout of a solar module for use in a power generation system according to the disclosure.

FIG. 4 shows schematically how a power generation plant 1 can be set up using connectors, so that it can implement the inventive teaching, but at the same time largely corresponds to a conventional power generation plant. A solar module 10 is divided into three sub-modules 11, each with bypass diodes connected in parallel, which are arranged between two solar module connections 12. In addition, the solar module 10 has a supply connection 13, which is connected to a connection point between two sub-modules 11. The solar module connections 12, as well as the supply connection 13 can be located in a junction box of the solar module 10. In the case shown, further solar modules 10, which together form a string 20, are only represented by a single module for the sake of simplicity.

The solar module 10 is connected to a string connection 52 of the inverter 30 at a solar module connection 12 via a first power line 50 and conventional SunClix connectors. A second power line 50 is connected to the second solar module connection 12, which is led to a modified connector 90 together with a connecting line 60, which is connected to the supply connection 13. The modified connector 90 is described in more detail in connection with FIG. 5 and is connected to a modified mating connector 100, which is described in more detail in connection with FIG. 6. Starting from the modified mating connector 100, the power line 50 and the connecting line 60 run within a common external insulation 110 to a further modified connector 90, so that this connection forms a supply line for the power generation system 1. The further modified connector 90 is then connected via a further modified mating connector 100 to a supply connection 61 and a string connection 51 of the inverter 30. In this way, the power generated by the corresponding sub-modules 11 of the solar module 10 is provided via the solar module connections 12, 13, the lines 50, 60, as well as the plug connection via the modified connector 90 and the modified mating connectors 100 at the connections 51, 61 and can be used as alternative operating power by the inverter 30. The string connection 51 and the supply connection 61 can be designed as mating connectors permanently mounted on the housing of the inverter 30, similar to the modified mating connector 100 (not shown). In this case, the modified connector 90 shown can be connected to the inverter 30 via a supply line, in which the connecting line 60 and the power line 50 are each provided with a modified connector 90 at one end and a modified mating connector 100 at the other end.

FIGS. 5a and 5b shows more details of a modified connector 90, where FIG. 5a shows the modified connector 90 in a front view and FIG. 5b shows the modified connector 90 in a side view. The modified connector 90 comprises a housing whose geometrical dimensions correspond to the geometrical dimensions of a conventional SunClix connector. A central contact structure 55, which can be connected to a power line 50 and is designed to transmit the entire string current of a solar generator, also corresponds to the contact structure of a conventional SunClix plug. In addition, the modified connector 90 has a lateral attachment made of insulating material with a further contact structure 65, which can be connected to the connecting line 60. The further contact structure 65 can be designed as a contact pin, and the attachment is, in one embodiment, designed in such a way that the contact structure 65 is arranged inside the attachment in a touch-safe manner.

Figure 5:
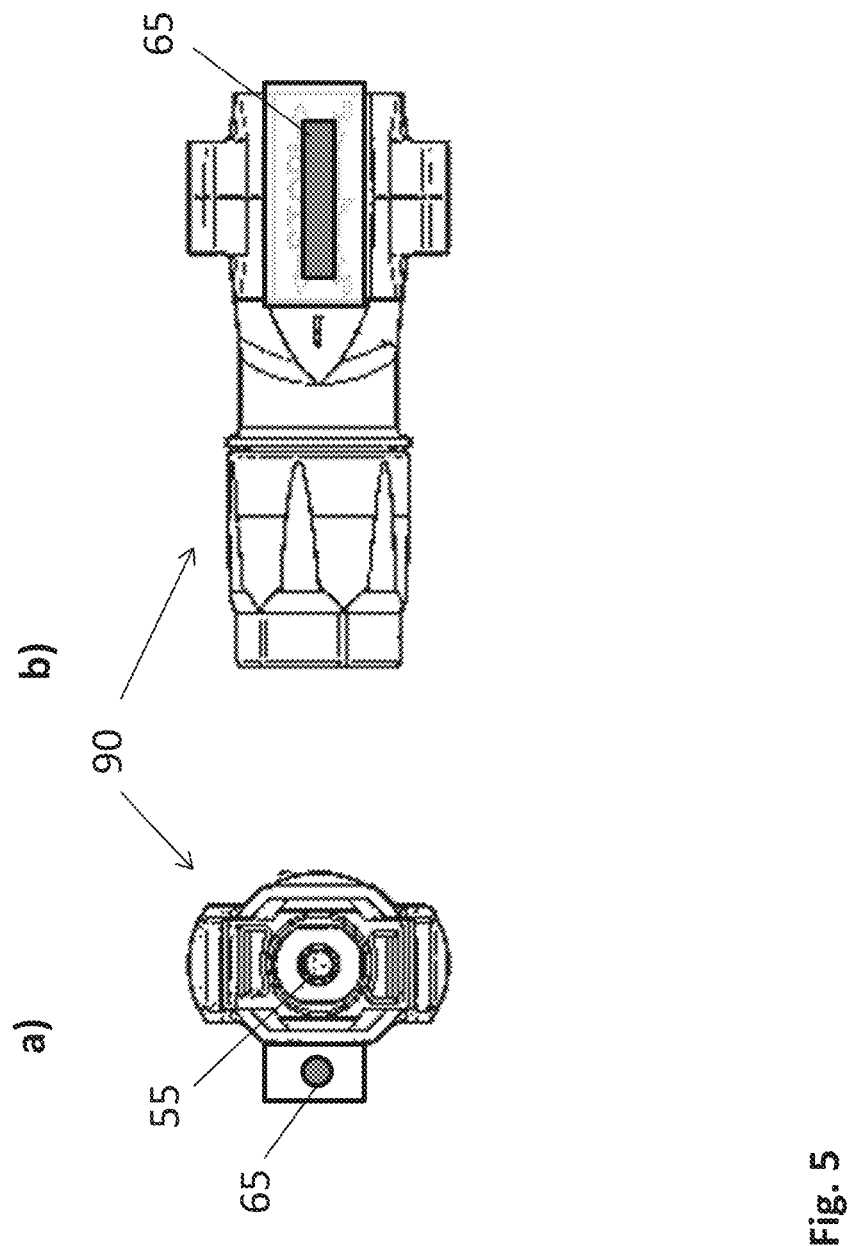
FIG. 5 shows a layout of a plug of a supply line according to the disclosure.

FIGS. 6a and 6b shows further details of a modified mating connector 100, where FIG. 6a shows the modified mating connector 100 in a front view and FIG. 6b shows the modified mating connector 100 in a side view. The modified mating connector 100 comprises a housing whose geometric dimensions correspond to the geometric dimensions of a conventional SunClix mating connector. Also a central contact structure 55, which can be connected to a power line 50 and is designed to transmit the entire string current of a solar generator, corresponds to the contact structure of a conventional SunClix mating connector. In addition, the modified mating connector 100 has a lateral attachment made of insulating material with a further contact structure 65, which can be connected to the connecting line 60. The further contact structure 65 can be designed as a contact sleeve, and the attachment is, in one embodiment, designed in such a way that the contact structure 65 is arranged inside the attachment in a touch-safe manner. Furthermore, the attachment of the modified mating connector 100 is designed in such a way that it can be plugged into a modified connector 90 as shown in FIG. 5, and both the contact structures 55 and the contact structures 65 of the modified connector 90 are electrically connected to the contact structures 55 and the contact structures 65 of the modified mating connector 100. The contact structures 55, 65 are protected against dirt by the housings or attachments of the connector and the mating connector inserted into each other, for example by inserting the attachments into each other.

Due to the lateral arrangement of the attachment, both the modified connector 90 and the modified mating connector 100 can still be plugged into conventional SunClix connectors or mating connectors. In this way, a conventional power generation system can be converted into a power generation system in accordance with the disclosure by replacing the SunClix connectors and a little cabling effort. Exposed plug contacts, which are created by inserting conventional SunClix connectors into inventive connectors or mating connectors, can be protected from dirt and corrosion by means of sealing caps.

The invention claimed is:

1. A photovoltaic power generation system, comprising:
a string comprising a series connection of solar modules;
an inverter comprising a first connection and a second connection configured to electrically connect to the string via first and second power lines, respectively, for converting and feeding electrical power from the string into a network,
wherein the inverter is configured to obtain an alternative operating power from only one of the solar modules in the event that normal operating power can not be obtained from the network or from the entire string,
wherein the inverter comprises a further connection configured to receive the alternative operating power from a third power line in combination with one of the first power line and the second power line connected to the string and to the inverter.

2. The photovoltaic power generation system according to claim 1, wherein the one of the solar modules is placed at one end of the series connection of solar modules.

3. The photovoltaic power generation system according to claim 1, wherein the one of the solar modules has a submodule connection which is electrically connected to an intermediate point between sub-modules of the one solar module, wherein the alternative operating power is obtained from a voltage applied between the submodule connection and a solar module connection of the one solar module.

4. The photovoltaic power generation system according to claim 1, wherein the alternative operating power is obtained from a voltage applied between solar module connections of the one solar module.

5. The photovoltaic power generation system according to claim 1, further comprising a DC/DC converter arranged between the one solar module and the inverter, and configured to convert the alternative operating power to a usable power at the inverter.

6. The photovoltaic power generation system according to claim 5, wherein the DC/DC converter is integrated into the inverter.

7. The photovoltaic power generation system according to claim 1, wherein the inverter is configured to receive the alternative operating power via the first and second power lines, and further comprising a blocking diode arranged in a connecting line between the one of the solar modules and one of the first power line and the second power line.

8. The photovoltaic power generation system according to claim 7, wherein the blocking diode is integrated into the inverter.

9. The photovoltaic power generation system according to claim 1, wherein the further connection and the first and second connections of the inverter are integrated in a common socket.

10. The photovoltaic power generation system according to claim 9, wherein a connecting line is provided for the transmission of the alternative operating power and is installed in the photovoltaic power generation system together with the first and second power lines connected to the first and second connections.

11. The photovoltaic power generation system according to claim 10, wherein the connecting line and the one of the first and second power lines are electrically isolated from one another yet reside within a common supply cable with a common external insulation, which at both ends has a connector with respective plug contacts for the connecting line and the one of the first and second power lines.

12. The photovoltaic power generation system according to claim 1, wherein the photovoltaic power generation system is configured to electrically disconnect all solar modules of the string from one another and/or to short-circuit all solar modules except for the one solar module of the string in the event of disconnection from the grid and/or in the event of danger.

13. The photovoltaic power generation system of claim 1, further comprising a supply line comprising:
   one of the first and second power lines configured to transmit a string current of the photovoltaic power generating system to the inverter,
   a connecting line configured to transmit the alternative operating power from one solar module of the string to the inverter,
   wherein an external insulation surrounds the first and second power lines and the connecting line and which has an insulation resistance to a string voltage of the photovoltaic power generating system, and
   a male or female connector at each of the two ends of the supply line, wherein each of the male or female connector have a plug contact for the first and second power lines and a plug contact for the connecting line,
   wherein the one of the first and second power lines and the connecting line are insulated from one another with an insulation strength which is lower than the insulation strength with respect to the string voltage of the photovoltaic power generation system.

* * * * *